United States Patent Office 3,055,868
Patented Sept. 25, 1962

3,055,868
HIGHLY POLYMERIC POLYMETHYLENE TEREPHTHALATES
James Eric McIntyre and John Skinner Macnab Robertson, Harrogate, England, assignors to Imperial Chemical Industries Limited, London, England, a corporation of Great Britain
No Drawing. Filed June 1, 1959, Ser. No. 817,090
Claims priority, application Great Britain June 13, 1958
7 Claims. (Cl. 260—75)

This invention relates to the manufacture of highly polymeric polymethylene terephthalates, more particularly to the use of a catalyst system in the manufacture of these polyesters.

In the common method of commercial manufacture of highly polymeric polymethylene terephthalates, a dialkyl terephthalate is ester-interchanged in the presence of an ester-interchange catalyst and the resulting product, a bis-hydroxyalkyl terephthalate, is polycondensed in the presence of a polycondensation catalyst. Commonly the polycondensation catalyst is added to the initial ester-interchange reaction mixture, for the majority of prior art polycondensation catalysts do not normally interfere with the ester-interchange reaction.

It is known, for example, from British Patent No. 804,753 to use antimony fluoride as a catalyst in the polycondensation of a bis-hydroxyalkyl terephthalate, obtained by an ester-interchange process, using manganese formate as a catalyst, to a highly polymeric polymethylene terephthalate, but it is stated therein that this catalyst must be added to the reaction mixture immediately prior to the polycondensation stage, as it strongly inhibits the ester-interchange stage.

Many ester-interchange catalysts if allowed to remain in active form during the polycondensation stage tend to promote colour formation in the final polyester and for this reason, compounds of metals such as calcium have in the past been preferred for use as ester-interchange catalysts, but such compounds suffer from the commercial disadvantage that they produce insoluble precipitates in the final polyester which give undesirable effects in fibres, films and the like produced from these polyesters.

It is known, for example, from British Patent 610,137 and U.S.P. 2,543,028 to use magnesium compounds such as the oxide or formate, as ester-interchange catalysts in the manufacture of highly polymeric polymethylene terephthalates. Such magnesium compounds give a rapid reaction rate and a colourless ester-interchange product. If allowed to remain in an active form in the polycondensation stage they are superior to compounds of calcium in that no insoluble precipitate is formed. However, they do promote colour formation in the final polyester and this disadvantage has hitherto restricted their commercial use as catalysts. We have found that by adding a strong acid this colour formation can be greatly reduced or prevented, but we have also found that the majority of strong acids give rise to magnesium salts which are insoluble in the resulting polyester. We have now found that magnesium compounds suitable as ester-interchange catalysts can be inactivated without formation of an insoluble precipitate, by the addition of at least a stoichiometric equivalent of antimony trifluoride and that the polycondensation of the ester-interchange product then gives a clear and colourless polyester. Although this inactivation can be undertaken using other trihalides of antimony, for example the trichloride or the tribromide, the colour of polymer prepared using these compounds is inferior to that obtained when using antimony trifluoride.

According to the present invention we provide a process for the manufacture of fibre and film-forming highly polymeric polymethylene terephthalates by reacting a dialkyl terephthalate with a glycol of the series $$HO(CH_2)_nOH$$

where $n=2-10$ inclusive and polycondensing the resulting bis-hydroxyalkyl terephthalate, wherein the ester-interchange reaction is carried out in the presence of at least one catalytic magnesium compound and the polycondensation reaction is carried out in the presence of at least one magnesium compound to which has been added antimony trifluoride in at least an equivalent amount to the magnesium compound present.

We have found that the glycoloxide, acetate, carbonate, oxide and terephthalate of magnesium are particularly suitable as ester-interchange catalysts and of these we prefer to use the glycoloxide or carbonate.

While the process as exemplified in this specification is illustrated by the use of dimethyl terephthalate and ethylene glycol as the starting materials, other alkyl esters of terephthalic acid such as diethyl terephthalate or other glycols such as 1:4 butanediol may also be used. Mixtures of these alkyl terephthalates and glycols may also be used or they may be used in admixture with alkyl esters of other acids such as those of isophthalic acid.

Although it is to be understood that we do not limit ourselves to the addition of the magnesium compound in the amounts we exemplify, we prefer to add amounts of magnesium compound between 0.01 and 0.15 mole percent, based on the dialkyl terephthalate used.

The following examples, in which all parts and percentages are by weight, illustrate but do not limit the scope of our invention.

The following ester interchange and polycondensation reactions were carried out under identical conditions. In each case 120 parts of highly purified dimethyl terephthalate and 97 parts of highly purified ethylene glycol were charged into a flask together with the ester-interchange catalyst and heated until the theoretical amount of methanol had been evolved. The ester-interchange product was charged (together with the polycondensation catalyst if not already present) to a polymerisation tube, free glycol was distilled off, and the residue was polymerised at a pressure of 0.005–0.02 mm. with a slow bleed of nitrogen through the molten mass for a period of two hours. The intrinsic viscosity thus attained is a measure of the rate of polycondensation.

*Table 1*

| Example No. | Ester interchange catalyst, percent by weight | Polycondensation catalyst or colour inhibitor | | Melt colour | Intrinsic viscosity |
|---|---|---|---|---|---|
| | | Percent by weight | Time of addition relative to ester interchange | | |
| 1 | Magnesium carbonate (basic) 0.035% | Antimony trioxide 0.04% | Before and after | Clear, pale yeollow | 0.5 |
| 2 | ____do____ | ____do____ | ____do____ | ____do____ | 0.6 |
| 3 | ____do____ | p-Toluene-sulphonic acid 0.16% | After | Hazy, colourless | 0.7 |
| 4 | ____do____ | Antimony trifluoride 0.05% | ____do____ | Clear, colourless | 0.7 |

Ester interchange and polymerisation reactions were carried out under the conditions used for Examples 1–4, using the magnesium compounds listed in Table II as ester interchange catalyst and in each case adding antimony trifluoride (0.05% by weight on dimethyl terephthalate charged) at a temperature of 160–190° C. after the ester-interchange was complete.

*Table II*

| Ex. No. | Ester interchange catalyst, percent by weight on dimethyl terephthalate | Optical density at 400μ of 10% soln. in dichloroacetic acid |
|---|---|---|
| 5 | Basic magnesium carbonate, 0.028% | 0.08 |
| 6 | Magnesium acetate, 0.09% | 0.07 |
| 7 | Magnesium oxide, 0.017% | 0.09 |
| 8 | Magnesium glycoloxide, 0.035% | 0.06 |
| 9 | Magnesium terephthalate, 0.08% | 0.10 |

The optical density at 400μ of a 10% solution of the polymer in dichloroacetic acid is a more accurate measure of the yellowness of the polymer than visual comparison. All the polymers made with antimony trifluoride above had solution densities of 0.1 or below and appeared colourless, but slightly grey in bulk. Polymers made according to Examples 1 and 2 had solution optical densities of 0.25 and 0.38 respectively and were pale yellow in appearance. Polymers made using the ester-interchange catalysts of Examples 6 to 9 together with antimony trioxide as polymerisation catalyst were also pale yellow in appearance.

By comparison polymer was made by the method of Example 4, but using antimony trichloride (0.062% by weight on dimethyl terephthalate charged) instead of antimony trifluoride. The solution optical density of the resulting polymer was 0.15, which represented a substantial improvement over the use of antimony trioxide.

When this example was repeated in a stainless steel polymerisation vessel, although little or no corrosion of the stainless steel was detected, the iron content of the polymer was 20–40 p.p.m. higher than with antimony trioxide or antimony trifluoride. Antimony trifluoride did not affect the iron content and is therefore preferable to antimony trichloride.

Polymer made by the method of Example 4 but using antimony tribromide (0.1% by weight on dimethyl terephthalate charged) was pale red-brown in colour, and inferior to the product made using antimony trifluoride.

In each example, the polyester formed was capable of being converted into fibres, filaments and films by a melt extrusion process.

What we claim is:

1. In the process of manufacture of fiber- and film-forming highly polymeric polymethylene terephthalates wherein a dialkyl terephthlate is reacted under ester interchange conditions with a glycol of the series $$HO(CH_2)_nOH$$

where $n=2–10$ inclusive, and the resulting glycol terephthalates are polycondensed in the presence of a polycondensation catalyst system to form the highly polymeric polymethylene terephthalate; the improvement which comprises (1) employing as the sole ester-interchange catalyst between about 0.01 and about 0.15 mole percent of said dialkyl terephthalate of a catalytic magnesium compound and (2) carrying out the polycondensation reaction in the presence of said magnesium compound to which has been added a polycondensation catalyst consisting essentially of antimony trifluoride in at least an equivalent amount to the magnesium compound present.

2. A process according to claim 1 wherein the highly polymeric polymethylene terephthalate is polyethylene terephthalate.

3. A process according to claim 1, wherein the magnesium compound used is the glycoloxide.

4. A process according to claim 1, wherein the magnesium compound used is the carbonate.

5. A process according to claim 1, wherein the magnesium compound used is the oxide.

6. A process according to claim 1, wherein the magnesium compound used is the acetate.

7. A process according to claim 1, wherein the magnesium compound used is the terephthalate.

References Cited in the file of this patent

UNITED STATES PATENTS

| 2,465,319 | Whinfield | Mar. 22, 1949 |
| 2,681,360 | Vodonik | June 15, 1954 |
| 2,739,957 | Billica | Mar. 27, 1956 |
| 2,921,051 | Amborski et al. | Jan. 12, 1960 |